US006423190B2

United States Patent
Hemingway et al.

(10) Patent No.: US 6,423,190 B2
(45) Date of Patent: Jul. 23, 2002

(54) PULSE DENSITY MODULATION FOR UNIFORM BARRIER DISCHARGE IN A NONTHERMAL PLASMA REACTOR

(75) Inventors: Mark David Hemingway, Columbiaville; David Alexander Goulette, Marine City, both of MI (US); Eugene V. Ripley, Russiaville, IN (US); Darrell R. Herling, Kennewick, WA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/741,762

(22) Filed: Dec. 19, 2000

Related U.S. Application Data

(60) Provisional application No. 60/174,954, filed on Jan. 7, 2000.

(51) Int. Cl.$^7$ ................................................ B01J 19/08
(52) U.S. Cl. ................ 204/164; 204/177; 422/186.04; 60/275
(58) Field of Search ................................ 204/177, 164; 422/186.04; 60/275

(56) References Cited

U.S. PATENT DOCUMENTS

| | | | | |
|---|---|---|---|---|
| 6,007,681 A | * | 12/1999 | Kawamura et al. | 204/177 |
| 6,139,694 A | * | 10/2000 | Rogers et al. | 204/177 |
| 6,238,525 B1 | * | 5/2001 | Lox et al. | 204/177 |

* cited by examiner

Primary Examiner—Kishor Mayekar
(74) Attorney, Agent, or Firm—Vincent A. Cichosz

(57) ABSTRACT

An exhaust treatment system is provided for use with an internal combustion engine of a motor vehicle. The exhaust treatment system includes a parallel plate, monolithic plasma reactor for reducing nitrogen oxides in the exhaust gas from the engine, an electric power source for providing an electrical signal to the electrodes of the plasma reactor, and a controller interconnected between the electric power source and the plasma reactor for modulating the electrical signal to the plasma reactor. More specifically, the electric power source provides an alternating current electrical signal and the controller modulates the electrical signal off in accordance with a predetermined duty cycle, thereby achieving uniform barrier discharge in the plasma reactor.

15 Claims, 4 Drawing Sheets

PULSE DENSITY MODULATION FOR UNIFORM BARRIER DISCHARGE IN A NONTHERMAL PLASMA REACTOR

This application claims priority to U.S. Provisional Application No. 60/174,954 filed Jan. 7, 2000.

TECHNICAL FIELD

The present invention relates generally to non-thermal plasma reactors for use in conjunction with internal combustion engines and, more particularly, to a method for providing uniform barrier discharge in a parallel plate, monolithic plasma reactor.

BACKGROUND OF THE INVENTION

Non-thermal plasma has shown promise as a means for reducing nitrogen oxide (NOx) emissions found in the exhaust gas of an internal combustion engine of a motor vehicle. Although there are several well known non-thermal reactor designs, many of these designs are not able to withstand the wide temperature swings and vibrations associated with a motor vehicle. To properly function in the context of a motor vehicle, a parallel plate, monolithic reactor was developed by the assignee of the present invention.

However, the parallel plate, monolithic plasma reactor exhibits non-uniform plasma distribution during certain engine operating conditions. Although exhaust gas is successfully treated during low flow conditions, the monolithic plasma reactor may exhibit non-uniform plasma distribution during high flow conditions. In order to properly treat the exhaust gas, the plasma reactor must supply more power (i.e., energy density) into the exhaust gas at the elevated flow conditions. There are generally two ways to increase the energy density going into the exhaust gas. A first way is to increase the peak voltage of the applied electrical signal. However, increasing the voltage amplitude is limited by the dielectric strength of the ceramic sheets that form the parallel plate, monolithic plasma reactor. A second way is to increase the frequency of the alternating current electrical signal. In this case, increasing the frequency of the electrical signal substantially increases the non-uniformity of the plasma distribution in the monolithic plasma reactor. This in turn results in non-uniform gas treatment.

Thus, there is a need for providing uniform plasma distribution over a wide range of engine operating conditions handled by a non-thermal plasma reactor in a motor vehicle.

SUMMARY OF THE INVENTION

In accordance with the present invention, an exhaust treatment system is provided for use with an internal combustion engine in a motor vehicle. The exhaust treatment system includes a parallel plate, monolithic plasma reactor for reducing nitrogen oxides in the exhaust gas from the engine, an electric power source for providing an electrical signal to the electrodes of the plasma reactor, and a controller interconnected between the electric power source and the plasma reactor for modulating the electrical signal to the plasma reactor. More specifically, the electric power source provides an alternating current electrical signal and the controller modulates the electrical signal off in accordance with a predetermined duty cycle, thereby achieving uniform barrier discharge in the plasma reactor.

For a more complete understanding of the invention, its objects and advantages, refer to the following specification and to the accompanying drawings.

DESCRIPTION OF THE PREFERRED EMBODIMENT

Figure 1:
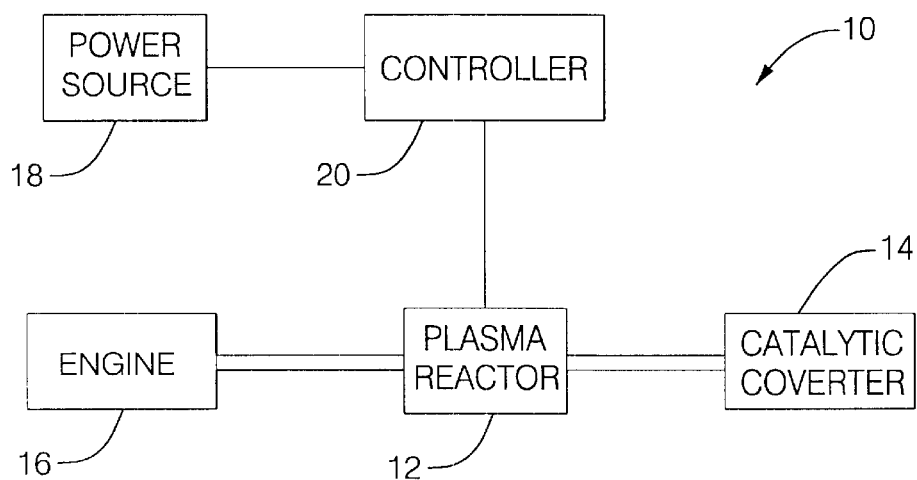
FIG. 1 is a schematic diagram illustrating an exhaust treatment system in accordance with the present invention.

An exhaust treatment system 10 for use in a motor vehicle is shown in FIG. 1. The exhaust treatment system 10 includes a non-thermal plasma reactor 12 interconnected between a catalytic converter 14 and an internal combustion engine 16. The non-thermal plasma reactor 12 is generally used to reduce nitrogen oxides in the exhaust gas from the engine 16. An electric power source 18 provides a high voltage, alternating current electrical signal to the non-thermal plasma reactor 12. In addition, a controller 20 may be interconnected between the electric power source 18 and the plasma reactor 12. As will be more fully explained below, modulating the electrical signal via the controller 20 achieves uniform barrier discharge in the plasma reactor 12.

In operation, exhaust gas from the engine 16 typically includes nitrogen oxides, hydrocarbons, nitrogen, oxygen, water, carbon monoxide, and carbon dioxide. As will be apparent to one skilled in the art, a corona discharge within the reactor causes a chemical reaction between the gas molecules as the exhaust gas passes through the plasma reactor 12. As a result, the emissions in the exhaust gas are converted to nitrogen dioxide, metastables, partially oxidized hydrocarbons, oxygen, water, nitrogen, carbon monoxide, and carbon dioxide. In order to complete the partial reactions initiated by the plasma reactor 12, an inlet of the catalytic converter 14 is connected with an outlet of the plasma reactor 12. The emissions from the plasma reactor 12 are in turn converted primarily to nitrogen, oxygen, water and carbon dioxide.

By "pulsing" the electrical signal to the plasma reactor, the energy density of the electrical signal can be delivered at the optimum frequency while the corona discharge remains uniform across the plasma reactor 12. For purposes of this discussion, the frequency of the alternating current from the electrical power source 18 is referred to as the carrier frequency. The modulation frequency or duty cycle is then defined as the time in which the alternating current signal is applied to the plasma reactor. For instance, if the alternating current signal is applied (or "on") only 10% of the time over a given period, this is a 10% duty cycle. Using this "pulsing" approach, the energy density going into the exhaust gas can be controlled using the carrier frequency, the modulation frequency and the amplitude of the electrical signal.

In accordance with the present invention, the carrier frequency is preferably on the order of 1,000 Hertz with a modulation frequency on the order of 200 times per second. Further studies indicate that limiting the width of the carrier frequency to a single 360 degree period and using the modulation frequency as the primary energy modulation method provides the optimal energy transfer to the exhaust gas. Therefore, a series of single period pulses may be applied at varying intervals. Since the number of pulses applied in a given interval is known as the density of pulses, this pulsing technique may be referred to as pulse density modulation.

Figure 2:
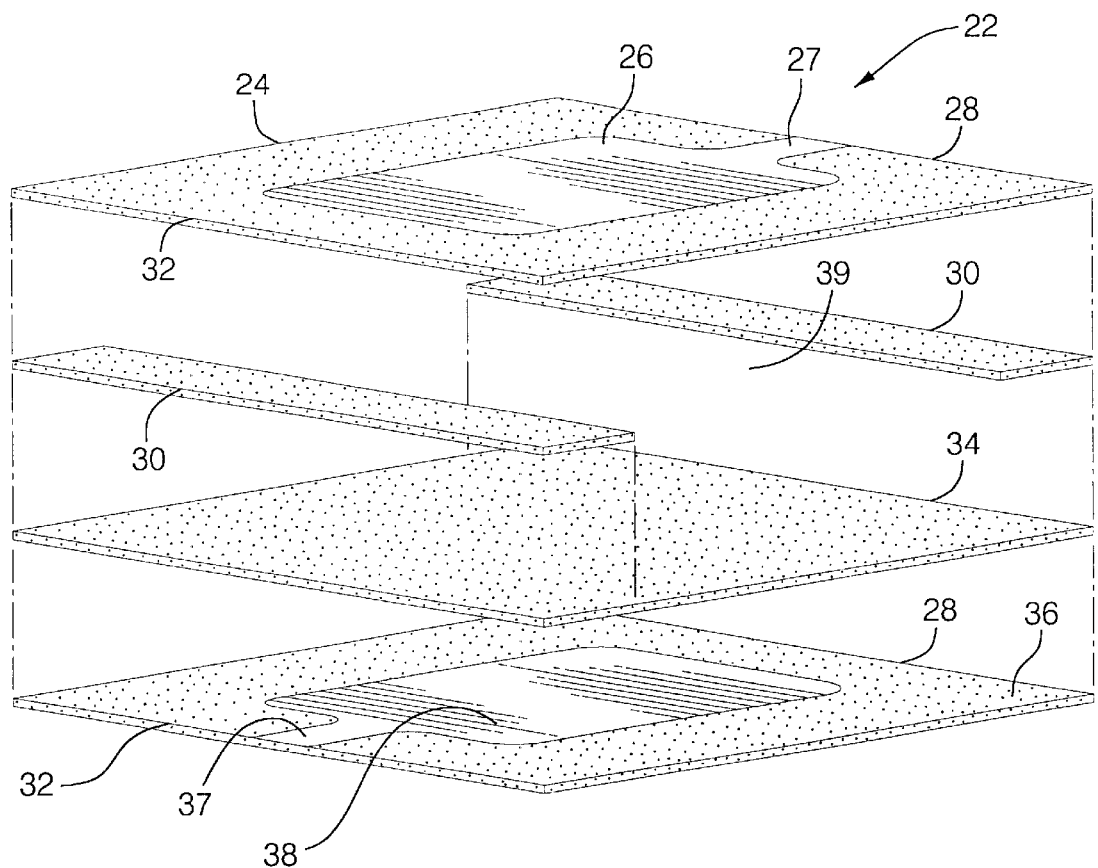
FIG. 2 is an exploded pictorial view showing the construction of a single cell which may be used to construct an exemplary parallel plate, monolithic plasma reactor element.
Figure 3:
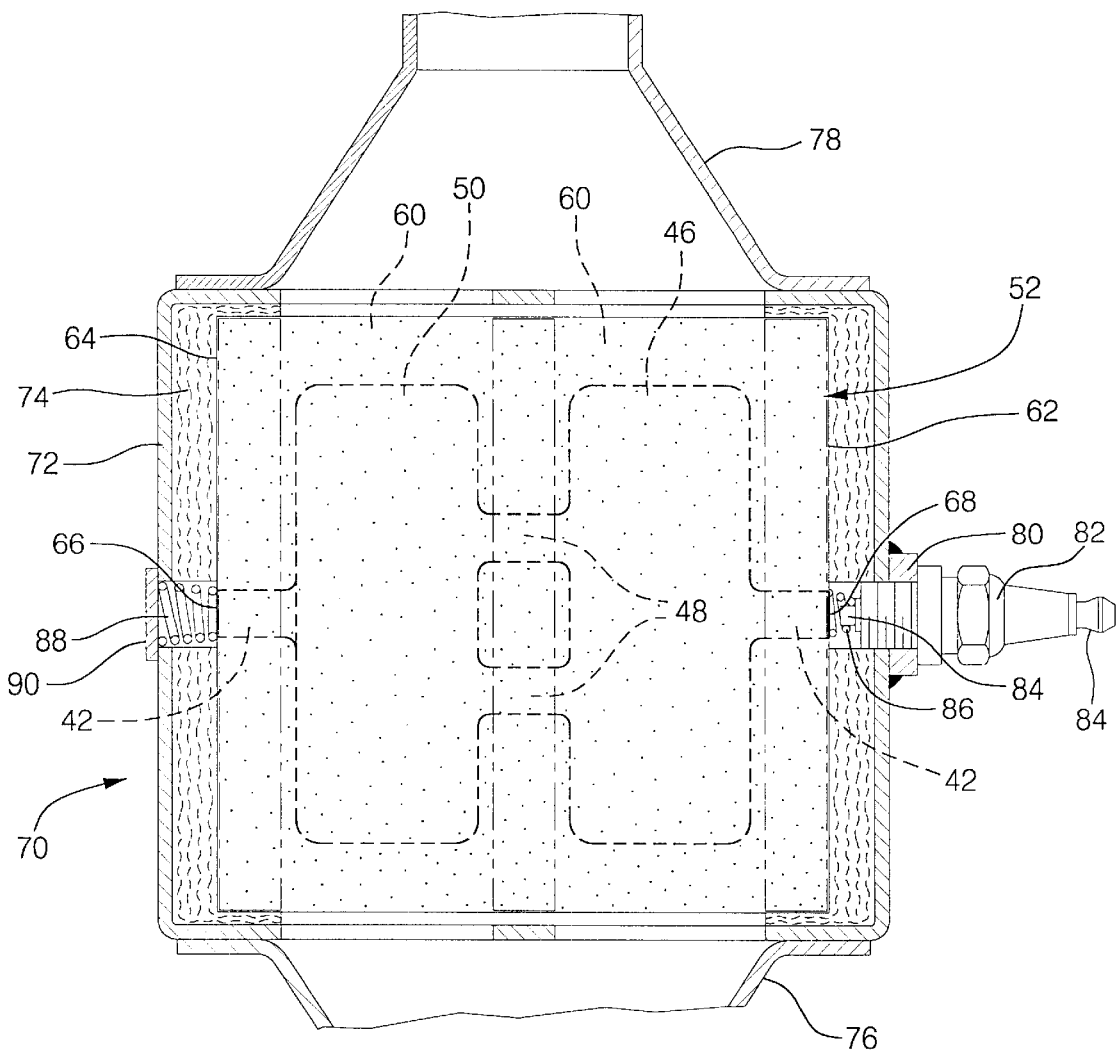
FIG. 3 is a cross-sectional view through an exemplary plasma reactor element illustrating a plurality of stacked cells.
Figure 4:
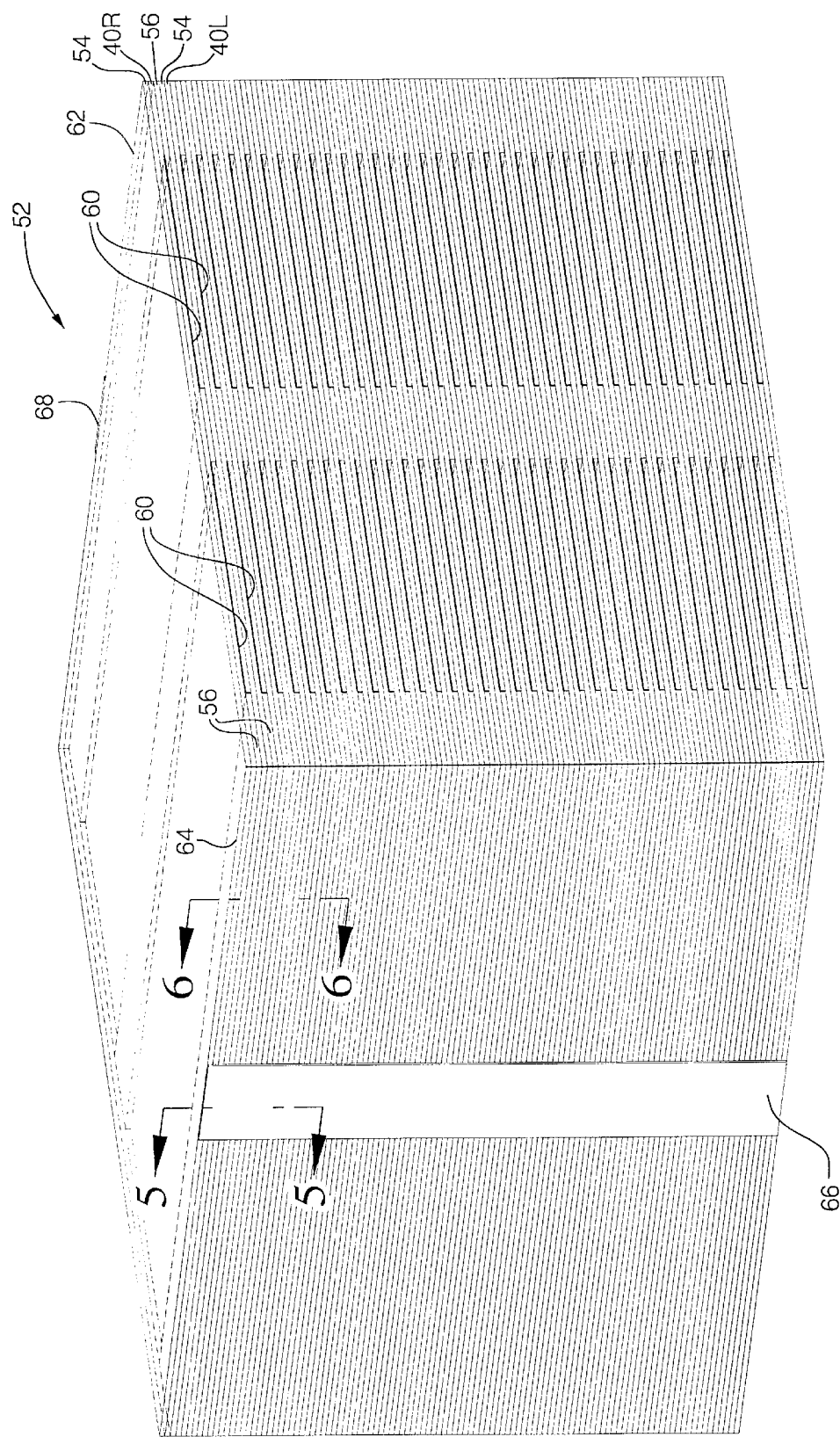
FIG. 4 is a top cross-sectional view of plasma reactor assembly for use in the exhaust treatment system of the present invention.

An exemplary non-thermal plasma reactor for use in a motor vehicle application is shown in FIGS. 2–4. In general, the plasma reactor employs a parallel plate, monolithic structure having a plurality of stacked cells, where each cell includes a plurality of insulating parallel plates that form gas passages therein and at least two electrodes disposed on opposite sides of the parallel plates. While the following description is provided with reference to this particular plasma reactor, it is readily understood that the broader aspects of the present invention are applicable to other types and/or configurations for the plasma reactor.

An exploded view of a single cell 22 within an exemplary plasma reactor is provided in FIG. 2. Each cell 22 includes a first insulating plate 24 having printed on one side thereof a generally rectangular first electrode 26. The first electrode 26 includes a narrow connector 27 extending to one edge 28 of the insulating plate 24. On the unprinted side of the insulating plate 24, a pair of spacers 30 engage the insulating plate 24. One spacer extends along the right edge 28 of the insulating plate 24, and the other spacer extends along an opposite left edge 32 of the insulating plate 24. The lower sides of the spacers 30 are engaged by a second insulating plate 34 which is also engaged on its opposite lower side by a third insulating plate 36. The third insulating plate 36 further includes a second electrode 38 printed on its upper surface. Again, a narrow connector 37 connects the second electrode 38 with the edge 32 of the lower third plate 36. Preferably, the connector 37 is disposed on the edge 32 of the plate that is opposite the edge 28 corresponding to the first electrode 26. One skilled in the art will readily recognize that the corners of the electrodes 26, 38 may be rounded to avoid creating focal points of voltage field lines that could concentrate energy and thereby break down the insulation within the cells.

In operation, exhaust gas is passed through a passage 39 formed by the spacers 30 between the first insulating plate 24 and the second insulating plate 34. Thus, the height of the passage 39 is equal to the thickness of the spacers 30. A high voltage, alternating current is applied to one electrode and the other electrode is grounded. In this configuration, the first insulating plate 24 and the second insulating plate 34 insulate the passage 39 from the electrodes which prevents any flow of electricity between the electrodes, and thus prevents any current flow between the electrodes. Since there is no current flow, the exhaust gas is not heated by the plasma reaction within the passage 39. However, an electric field is generated between the electrodes which increases the electron activity in the exhaust gas. As a result, a chemical reaction is induced that decomposes nitrogen oxides into nitrogen and oxygen.

Figure 5:
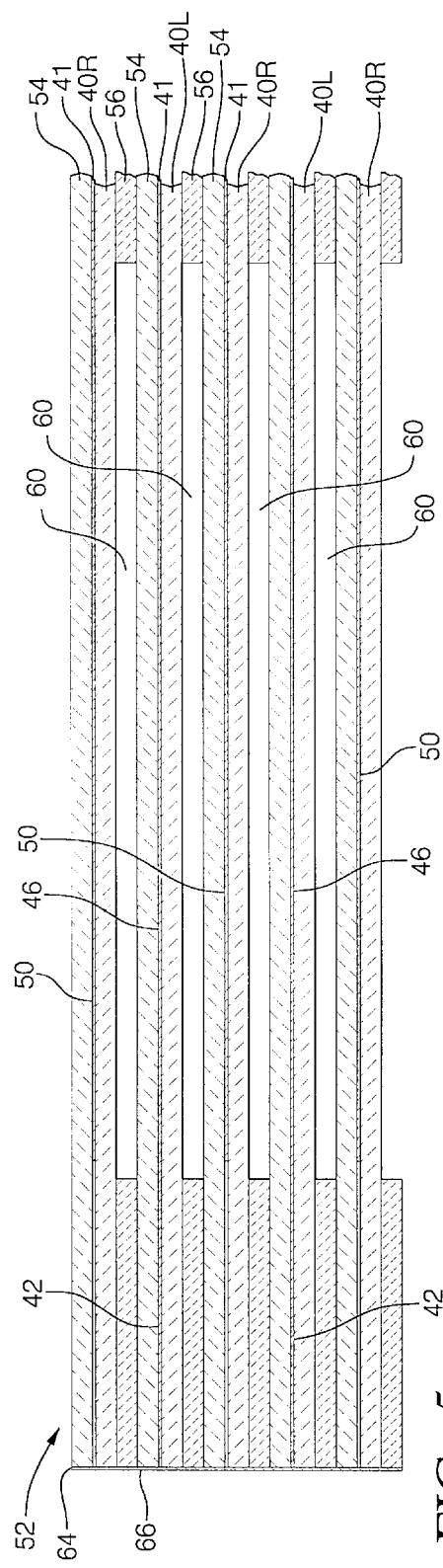
FIG. 5 is a fragmentary cross-sectional view from the plane of the line 5—5 of FIG. 4.
Figure 6:
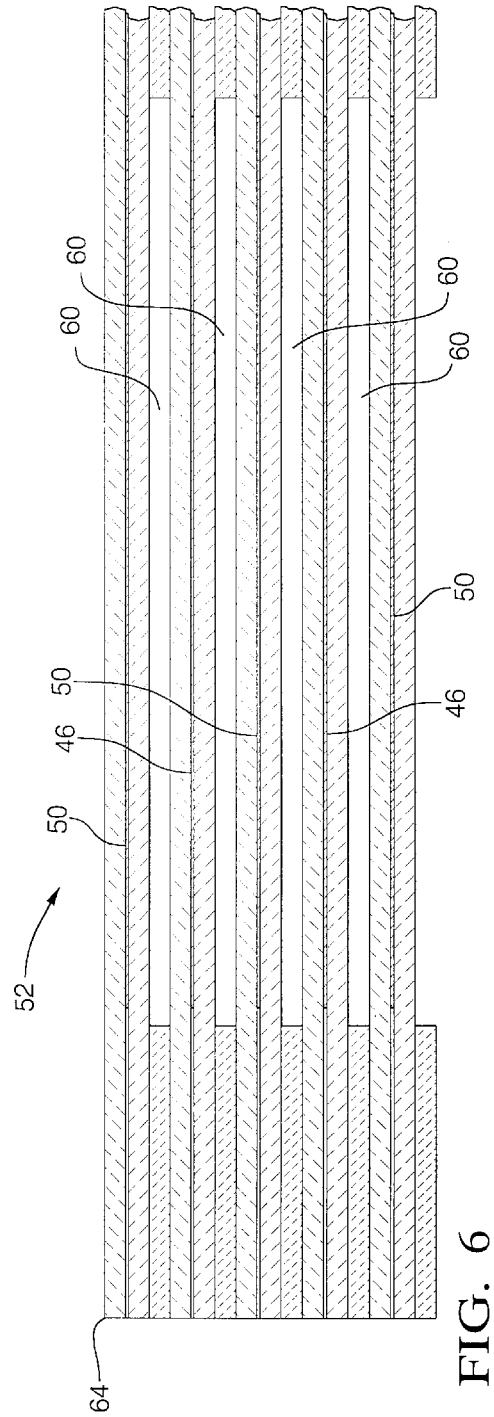
FIG. 6 is a fragmentary cross-sectional view from the plane of the line 6—6 of FIG. 4.

Referring to FIG. 4, an exemplary parallel plate, monolithic plasma reactor element is constructed from a plurality of stacked cells. In constructing the plasma reactor element, the first insulating plate of a first cell becomes the lower plate of a second stacked cell. The second cell is constructed by placing an uncoated insulating plate on top of the first insulating plate, positioning a pair of spacers on this insulating plate, and then placing another insulating plate placed on top of the spacers. In this manner, a stack of cells may be created which forms a plasma reactor element having a plurality of gas passages therethrough. The stacked cells may be further configured to form dual rows of vertically aligned passages as shown in FIGS. 5 and 6 which are fragmentary cross-sectional views of FIG. 4.

In constructing the plasma reactor element, the passages through the plasma reactor element are made thin so that the distance between the electrodes is also made small. This allows the development of an effective level of non-thermal plasma with voltages reduced to a range which can be provided in a motor vehicle application. In order to prevent the flow of electric current through the passages, the insulating plates are preferably made of material with a high dielectric constant. Although high density alumina is presently preferred, other insulating materials may also be suitable for the insulating plates. Conductive silver or platinum ink baked onto the insulating plates is preferred for the electrodes because it applies as a thin layer and thus avoids a need for separate wires or connectors. However, other conductive materials could be used for the electrodes.

A reactor assembly is shown in FIG. 3. The reactor assembly includes a high temperature housing enclosing a dielectric mat. The dielectric mat electrically insulates and forms a shock mount supporting a reactor element within the housing. The housing is preferably provided with inlet and outlet cones for connecting the housing into the vehicle exhaust system. Additional information relating to the above-described exemplary plasma reactor element and assembly may be found in U.S. patent application Ser. No. 09/268,496 filed on Mar. 11, 1999 which is incorporated herein by reference.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A method for providing uniform barrier discharge in a parallel plate, monolithic plasma reactor, comprising:

connecting an electrical power source to the plasma reactor;

passing exhaust gas through the plasma reactor; and pulsing an alternating current electrical signal from said electrical power source to the plasma reactor and modulating the alternating current electrical signal off in accordance with a predetermined duty cycle, thereby achieving uniform barrier discharge in the plasma reactor.

2. The method of claim 1 wherein the alternating current electrical signal has a frequency on the order of 1000 Hertz and the duty cycle has a rate on the order of 200 times per second.

3. The method of claim 1 wherein the parallel plate, monolithic plasma reactor fiber comprises a plurality of stacked cells for reducing nitrogen oxides in the exhaust gas, wherein each cell includes a plurality of insulating parallel plates forming gas passages therein and at least two electrodes disposed on opposite sides of said insulating parallel plates.

4. The method of claim 3 wherein said plurality of insulating plates are comprised of non-porous alumina material.

5. The method of claim 1 further comprising the steps of:

connecting an inlet of a catalytic converter to an outlet of said plasma reactor; and passing exhaust gas from said plasma reactor through said catalytic converter, thereby further reducing nitrogen oxides in the exhaust gas.

6. A method for reducing nitrogen oxides in the exhaust gas from an internal combustion engine, comprising:

providing a parallel plate, monolithic plasma reactor for reducing nitrogen oxides in exhaust gas;

connecting a high voltage, high frequency electrical power source to said plasma reactor;

connecting an inlet of said plasma reactor to an exhaust outlet of the internal combustion engine;

passing engine exhaust gas from the internal combustion engine through said plasma reactor; and pulsing an alternating current electrical signal from said electrical power source to said plasma reactor and modulating the alternating current electrical signal off in accordance with a predetermined duty cycle, thereby achieving uniform discharge in the plasma reactor.

7. The method of claim 6 wherein the alternating current electrical signal has a frequency on the order of 1000 Hertz and the duty cycle has a rate on the order of 200 times per second.

8. The method of claim 6 wherein the parallel plate, monolithic plasma reactor further comprises a plurality of stacked cells for reducing nitrogen oxides in the exhaust gas, wherein each cell includes a plurality of insulating plates forming gas passages therein and at least two electrodes disposed on opposite sides of said parallel plates.

9. The method of claim 8 wherein said plurality of insulating parallel plates are comprised of non-porous alumina material.

10. The method of claim 6 further comprising the steps of:

connecting an inlet of a catalytic converter to an outlet of said plasma reactor; and passing exhaust gas from said plasma reactor through said catalytic converter, thereby further reducing nitrogen oxides in the exhaust gas.

11. An exhaust treatment system for use in a motor vehicle having an internal combustion engine, comprising:

a plasma reactor having a plurality of stacked cells for reducing nitrogen oxides in the exhaust gas from the engine, wherein each cell includes a plurality of insulating parallel plates forming gas passages therein and at least two electrodes disposed on opposite sides of said insulating parallel plates;

an electric power source for providing an electrical signal to the electrodes of said plasma reactor;

a controller interconnected between said electric power source and said plasma reactor for modulating the electrical signal to the plasma reactor and wherein said controller modulates the electrical signal off in accordance with a predetermined duty cycle, thereby achieving uniform barrier discharge in the plasma reactor.

12. The exhaust treatment system of claim 11 wherein said electric power source provides an alternating current electrical signal having a frequency on the order of 1000 Hertz.

13. The exhaust treatment system of claim 11 wherein said predetermined duty cycle is on the order of 200 times per second.

14. The exhaust treatment system of claim 11 wherein said plurality of insulating parallel plates are comprised of non-porous alumina material.

15. The exhaust treatment system of claim 11 further comprising a catalytic converter, wherein an inlet of the catalytic converter is connected to an outlet of said plasma reactor, thereby further reducing nitrogen oxides in the exhaust gas.

* * * * *